UNITED STATES PATENT OFFICE.

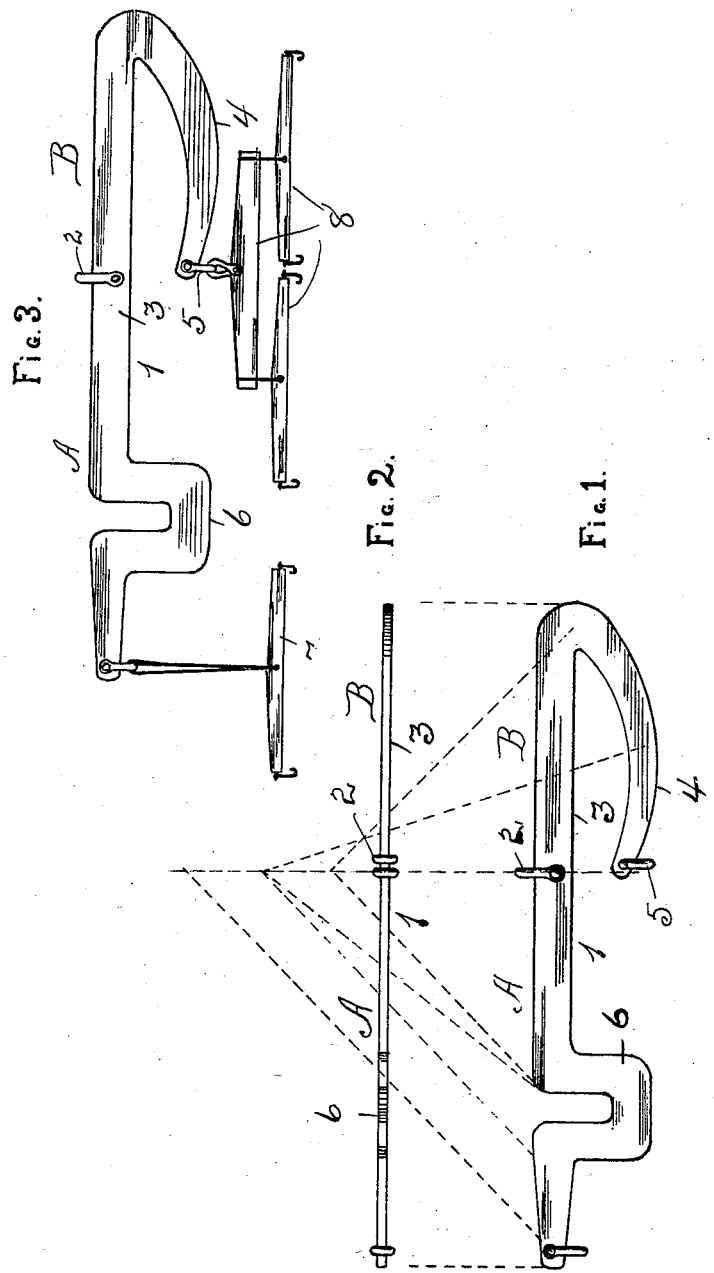

HENRY C. HORN, OF LITTLE YORK, ILLINOIS.

DRAFT-EQUALIZER.

No. 842,888.  Specification of Letters Patent.  Patented Feb. 5, 1907.

Application filed October 2, 1906. Serial No. 337,083.

*To all whom it may concern:*

Be it known that I, HENRY C. HORN, a citizen of the United States, residing at Little York, in the county of Warren and State of Illinois, have invented a new and useful Draft-Equalizer, of which the following is a specification.

The object of the invention, broadly stated, is to provide a three-horse draft-equalizer of such improved construction that inequality due to any cause whatever and tending to produce side draft on any tongued vehicle drawn by draft-animals will be avoided, my device being so constructed and arranged that the draft of two horses equals that of but one.

A secondary object of the invention is to provide a device whereby a much closer hitch may be had in the employment of such vehicles, one wheel of which vehicle is by my novel construction permitted to travel within a portion of the equalizer-bar.

To the end of effecting these objects the invention consists in an equalizer-bar of metal, preferably resilient, one end of which is bent or otherwise formed into hook shape and intermediate the distal end of which is a U-shaped extension.

In the accompanying drawings, which illustrate my invention, Figure 1 is a plan of my improved equalizer-bar; Fig. 2, a side view of the same; and Fig. 3, a view similar to Fig. 1, but showing it with the ordinary double and swingle trees attached to the equalizer-bar.

Referring now to the drawings by numerals and letters, 1 represents an equalizer-bar, and 2 a hammer-strap, through the medium of which strap and a pin said bar is pivoted to the usual wagon (or other vehicle) tongue. (Not shown.) It will be manifest that the clevis is swiveled or otherwise secured to the main portion 3 of the bar 1 in any desired manner. This end is bent upon itself, it being of suitable material and preferably resilient to form a hook 4, to the end of which is swiveled a clevis 5. As is necessary in this class of devices, the main bar 1 is bisected into a longer and a shorter arm, they being respectively represented by the letters A and B. About midway of the arm A it is bent to form a substantially U-shaped extension 6, in which the rim of the proximal wheel (not shown) of the wagon may travel.

7 and 8 represent, respectively, the swingle and double trees commonly used in this class of devices. As has hereinbefore been stated, the dotted lines show the points of equalization.

To a certain extent the advantages of the invention have been set forth in connection with the purposes and objects thereof and the detail description of the mechanism; but, concisely stated, the leading benefits secured thereby are as follows: First, by the construction of the U-shaped extension, thus allowing a wheel to travel therein, a much closer hitch is permissible, thereby doing away with a large portion of the draft; second, economy is subserved, it being only necessary to purchase the simple main bar, ordinary swingle and double trees being applicable; third, the main bar is practically indestructible; fourth, being preferably of resilient material it relieves the strain on the necks of the draft-animals and is therefore humane.

Having thus described my invention, what I claim as new, and desire to secure by Letters Patent, is—

1. An evener-bar comprising a main portion, a wheel-runway and a looped portion.

2. In a device of the character described, and in combination, an evener-bar provided with a wheel-runway and a looped end, a doubletree adapted for engagement therewith, and the short end of the lever adapted for engagement with a swingletree.

3. A device of the character described comprising a wheel-runway and an integral looped end, it being of resilient material.

In witness whereof I hereunto set my hand in presence of two witnesses.

HENRY C. HORN.

Witnesses:
W. R. CAMPBELL,
C. S. RICHARDS.